US012600140B2

(12) United States Patent
Watanabe et al.

(10) Patent No.: US 12,600,140 B2
(45) Date of Patent: Apr. 14, 2026

(54) INKJET PRINTER

(71) Applicant: Roland DG Corporation, Hamamatsu (JP)

(72) Inventors: Hironori Watanabe, Hamamatsu (JP); Akihiro Suzuki, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 98 days.

(21) Appl. No.: 18/397,114

(22) Filed: Dec. 27, 2023

(65) Prior Publication Data

US 2024/0217240 A1 Jul. 4, 2024

(30) Foreign Application Priority Data

Dec. 28, 2022 (JP) ................................ 2022-211578

(51) Int. Cl.

| | |
|---|---|
| ***B41J 2/17*** | (2006.01) |
| ***B41J 2/14*** | (2006.01) |
| ***B41J 2/165*** | (2006.01) |
| ***B41J 2/175*** | (2006.01) |
| ***B41J 29/17*** | (2006.01) |

(52) U.S. Cl.

CPC ............... *B41J 2/1721* (2013.01); *B41J 2/14* (2013.01); *B41J 2/16552* (2013.01); *B41J 2/17523* (2013.01); *B41J 29/17* (2013.01); *B41J 2002/16558* (2013.01); *B41J 2/1742* (2024.05); *B41P 2235/20* (2013.01)

(58) Field of Classification Search

CPC ........ B41J 2/1721; B41J 2/14; B41J 2/16552; B41J 2/17523; B41J 2/1742; B41J 29/17

See application file for complete search history.

(56) References Cited

U.S. PATENT DOCUMENTS

| | | | | |
|---|---|---|---|---|
| 5,825,380 A * | 10/1998 | Ichizawa | ................ | B41J 2/1707 347/30 |
| 2018/0207936 A1 | 7/2018 | Satake et al. | | |

FOREIGN PATENT DOCUMENTS

| | | | |
|---|---|---|---|
| CN | 108340674 A | | 7/2018 |
| JP | 04-19150 A | | 1/1992 |
| JP | 2020131447 A | * | 8/2020 |
| JP | 2022-040650 A | | 3/2022 |

OTHER PUBLICATIONS

Official Communication issued in corresponding Chinese Patent Application No. 202311773960.7, mailed on Jan. 29, 2026, 7 pages.

* cited by examiner

*Primary Examiner* — Jason S Uhlenhake

(74) *Attorney, Agent, or Firm* — Keating & Bennett, LLP

(57) ABSTRACT

An inkjet printer includes an ink head including a nozzle surface with nozzles, and an attachment portion to enable attachment or detachment of an ink refill container storing ink to be ejected from the nozzles or a washing liquid refill container storing a washing liquid usable to wash the nozzle surface. The attachment portion includes a housing to accommodate the ink refill container or the washing liquid refill container, a connection portion provided inside the housing and connectable with the ink refill container or the washing liquid refill container, and a tray provided in the housing and below the connection portion.

8 Claims, 8 Drawing Sheets

INKJET PRINTER

CROSS REFERENCE TO RELATED APPLICATION

This application claims the benefit of priority to Japanese Patent Application No. 2022-211578 filed on Dec. 28, 2022. The entire contents of this application are hereby incorporated by reference herein.

BACKGROUND OF THE INVENTION

1. Field of the Invention

The present invention relates to an inkjet printer.

2. Description of the Related Art

Inkjet printers that print an image on a recording medium by an inkjet method are conventionally known. Some of the inkjet printers perform refilling of ink by use of an ink cartridge or the like. For example, Japanese Laid-Open Patent Publication No. Hei 4-19150 discloses an inkjet printer allowing an ink case storing ink to be attached thereto or to be detached therefrom. The ink jet printer described in Japanese Laid-Open Patent Publication No. Hei 4-19150 includes a waste liquid receiver integrally formed with the ink case. It is described in Japanese Laid-Open Patent Publication No. Hei 4-19150 that waste ink dripped by purging or the like is recovered by the waste liquid receiver.

For example, Japanese Laid-Open Patent Publication No. 2022-40650 discloses an inkjet printer including a wiper that wipes a nozzle surface of an ink head. The inkjet printer described in Japanese Laid-Open Patent Publication No. 2022-40650 includes a washing tank storing a washing liquid in which the wiper is immersed.

SUMMARY OF THE INVENTION

Preferred embodiments of the present invention provide inkjet printers that each, in a case where ink or a washing liquid stored in a refill container leaks during or after the refill container is attached, reduces or prevents spreading of the leaking ink or washing liquid.

An inkjet printer disclosed herein includes an ink head including a nozzle surface with nozzles, and an attachment portion to enable attachment or detachment of an ink refill container storing ink to be ejected from the nozzles or a washing liquid refill container storing a washing liquid usable to wash the nozzle surface. The attachment portion includes a housing to accommodate the ink refill container or the washing liquid refill container, a connection portion provided inside the housing and connectable with the ink refill container or the washing liquid refill container, and a tray provided in the housing and below the connection portion.

With the above-described inkjet printer, even if the ink or the washing liquid leaks inside the housing from the connection portion while or after the ink refill container or the washing liquid refill container is connected with the connection portion, the leaking ink or washing liquid is accommodated in the tray provided in an area, in the housing, that is below the connection portion. This reduces or prevents spreading of the leaking ink or washing liquid to the outside of the attachment portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, inkjet printers (hereinafter, each referred to simply as a "printer") according to preferred embodiments of the present invention will be described with reference to the drawings. Preferred embodiments described herein are not intended to limit the present invention. Components and portions having the same functions will bear the same reference signs, and overlapping descriptions will be omitted or simplified when appropriate.

Figure 1:
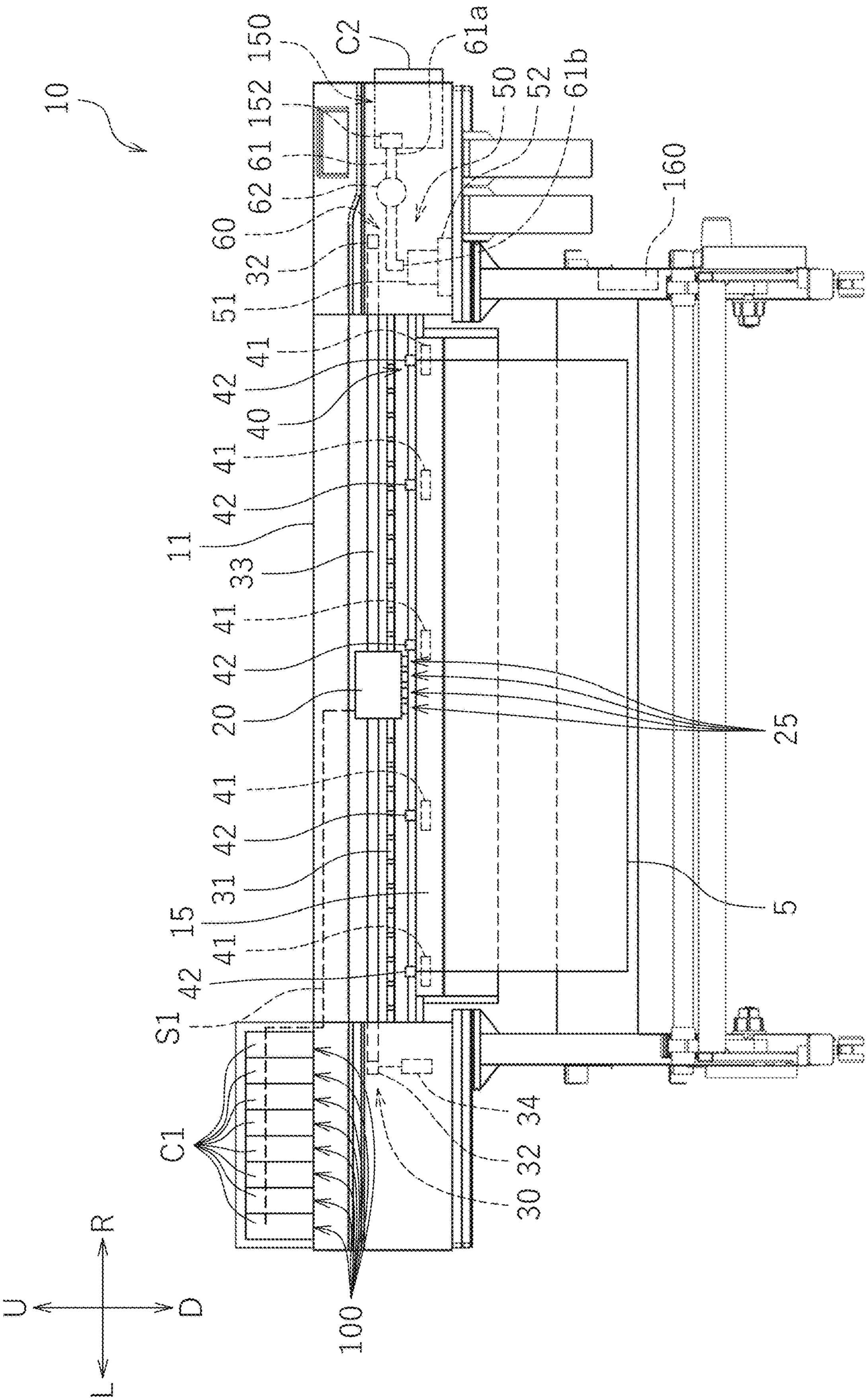
FIG. 1 is a front view of an inkjet printer according to a preferred embodiment of the present invention.

FIG. 1 is a front view of a printer 10 according to this preferred embodiment. In the following description, terms "left", "right", "up" and "down" will refer to left, right, up and down from an operator facing the printer 10. Where the operator is facing the printer 10, a direction from a rear portion of the printer 10 toward the operator will be referred to as "forward", and a direction from the operator toward the rear portion of the printer 10 will be referred to as "rearward". In the drawings, letters F, Rr, L, R, U and D respectively represent front, rear, left, right, up and down.

The printer 10 is for performing printing on a recording medium 5. The recording medium 5 is, for example, a recording paper sheet. The recording medium 5 is not limited to a recording paper sheet. The recording medium 5 may be paper such as plain paper, inkjet printing paper or the like; a resin material such as polyvinyl chloride (PVC), polyester or the like; a metal plate of aluminum, iron or the like; a glass plate; a wooden plate; a cardboard material; or the like.

As shown in FIG. 1, the printer 10 includes a platen 15, a carriage 20, a plurality of ink heads 25 mounted on the carriage 20, a carriage moving device 30, a transportation device 40 for the recording medium 5, a wiping device 50 wiping the ink heads 25, and a wiper washing device 60. A printer body 11 accommodates the platen 15, the carriage 20, the plurality of ink heads 25, the carriage moving device 30, the transportation device 40, the wiping device 50 and the wiper washing device 60.

The platen 15 is a support table supporting the recording medium 5. The platen 15 extends in a left-right direction and in a front-rear direction. The carriage 20 is provided above the platen 15. The ink heads 25 are provided in the carriage 20 and eject ink downward. With such a configuration, the ink is ejected onto the recording medium 5 placed on the platen 15. There is no specific limitation on the type of the ink ejected from the ink heads 25. The ink ejected from the ink heads 25 may be, for example, solvent-based pigment ink, water-based ink, photocurable ink (for example, UV-curable pigment ink cured by being irradiated with ultraviolet rays; so-called UV ink), or the like.

Figure 2:
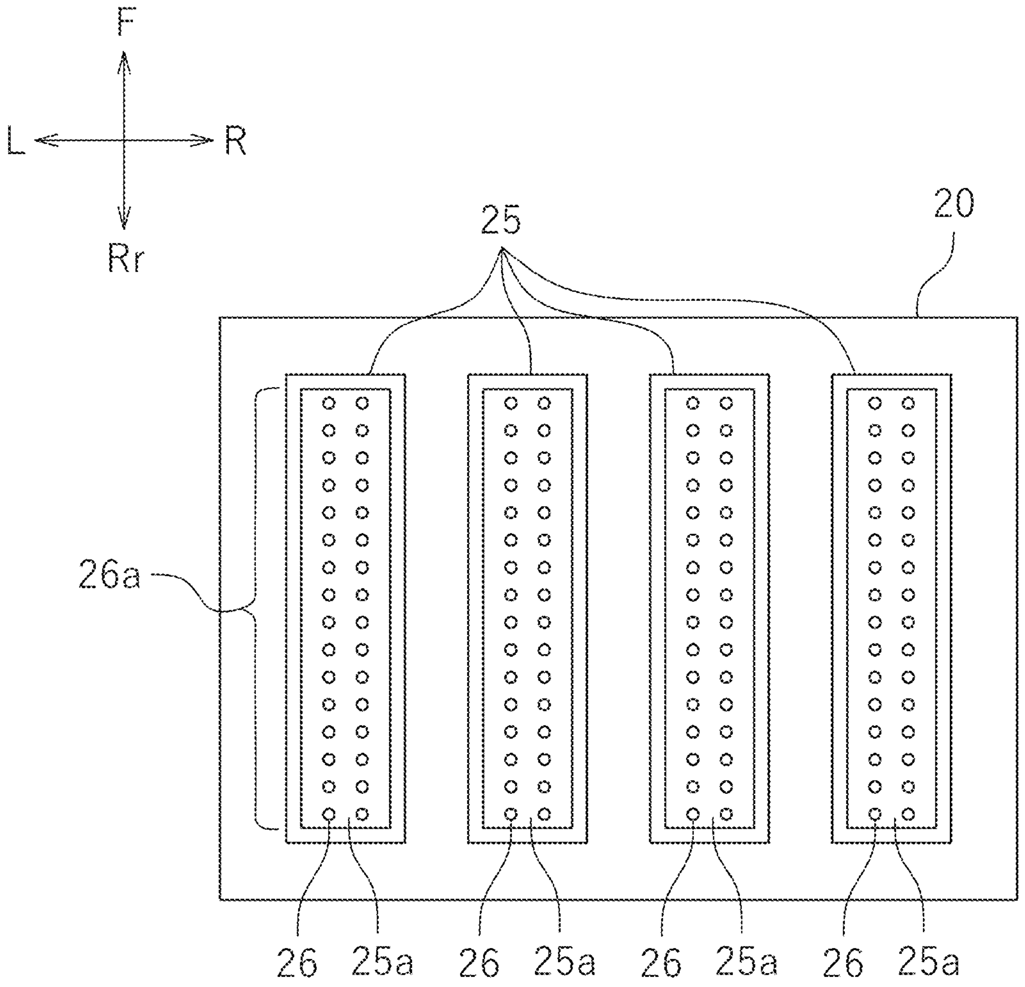
FIG. 2 is a plan view showing a configuration of a bottom surface of a carriage.

FIG. 2 is a plan view showing a configuration of a bottom surface of the carriage 20. As shown in FIG. 2, the plurality of ink heads 25 are aligned in the left-right direction. The ink heads 25 each include a nozzle surface 25*a* including a plurality of nozzles 26, through which the ink is ejected. In this preferred embodiment, the nozzle surface 25*a* is the bottom surface of each ink head 25. In each ink head 25, the plurality of nozzles 26 are aligned in the front-rear direction and define a nozzle column 26*a*. The ink to be ejected from the plurality of nozzles 26 is supplied from an ink cartridge C1 (see FIG. 1). The ink cartridge C1 is an example of an ink refill container storing the ink to be ejected from the nozzles 26. In this preferred embodiment, the ink in one ink cartridge C1 is ejected from the nozzles 26 in one nozzle column 26*a*. When the ink in the ink cartridge C1 is consumed, the ink cartridge C1 is replaced. As described below in more detail, the printer 10 allows a plurality of the ink cartridges C1 attached thereto.

The carriage moving device 30 moves the carriage 20 in the left-right direction. As shown in FIG. 1, the carriage moving device 30 includes a guide rail 31, left and right pulleys 32, an endless belt 33, and a scan motor 34. The guide rail 31 is located above the platen 15. The guide rail 31 extends in the left-right direction. The carriage 20 is movable in the left-right direction along the guide rail 31. The belt 33 is secured to the carriage 20. The belt 33 is wound along the left and right pulleys 32. The scan motor 34 is connected with one of the pulleys 32. The scan motor 34 is driven to rotate the one of the pulleys 32, so that the belt 33 runs. As a result, the carriage 20 moves in the left-right direction. The ink heads 25 move in the left-right direction together with the carriage 20.

The transportation device 40 moves the recording medium 5 in the front-rear direction. As shown in FIG. 1, the transportation device 40 includes grit rollers 41 and pinch rollers 42. The grit rollers 41 are embedded in the platen 15. Each of the grit rollers 41 is partially exposed on the platen 15. The transportation device 40 includes a feed motor (not shown) rotating the grit rollers 41. The pinch rollers 42 press the recording medium 5 from above. The pinch rollers 42 are located above the grit rollers 41. The pinch rollers 42 are located to face the grit rollers 41. The pinch rollers 42 are movable in an up-down direction. When the feed motor is driven to rotate the grit rollers 41 in a state where the recording medium 5 is held between the grit rollers 41 and the pinch rollers 42, the recording medium 5 is transported in the front-rear direction.

The wiping device 50 wipes the nozzle surfaces 25*a* of the ink heads 25. As shown in FIG. 1, the wiping device 50 includes a wiper 51 wiping the ink heads 25 and a wiper moving device 52. The wiper 51 is a plate-shaped structure extending in the left-right direction and the up-down direction. A top end of the wiper 51 is located slightly above the nozzle surfaces 25*a* of the ink heads 25. The wiper 51 is made of, for example, rubber. The wiper moving device 52 moves the wiper 51 in the front-rear direction. The wiper moving device 52 moves the wiper 51 in the front-rear direction, so that the nozzle surfaces 25*a* of the ink heads 25 are each wiped by the wiper 51. The wiping device 50 is not limited to having the above-described configuration. For example, the wiping device 50 may wipe the ink heads 25 in the left-right direction by using the movement of the carriage 20 in the left-right direction.

The wiper washing device 60 washes the wiper 51 to remove the ink attached to the wiper 51 as a result of the wiper 51 wiping the ink heads 25. In this preferred embodiment, the wiper washing device 60 drops a washing liquid onto the wiper 51 to remove the ink attached to the wiper 51. As a result, the wiping device 50 washes the nozzle surface 25*a* of each ink head 25 by use of the washing liquid supplied to the wiper 51 by the wiper washing device 60. That is, the washing liquid is also used to wash the nozzle surfaces 25*a* of the ink heads 25. Alternatively, the washing liquid may be used merely to wash the wiper 51. As shown in FIG. 1, the wiper washing device 60 is connected with a washing liquid cartridge attachment portion 150 described below. The wiper washing device 60 drops the washing liquid, in a washing liquid cartridge C2 attached to the washing liquid cartridge attachment portion 150, onto the wiper 51. The washing liquid cartridge C2 stores the washing liquid. The washing liquid cartridge C2 is an example of washing liquid refill container storing the washing liquid usable to wash the wiper 51 and the nozzle surface 25*a*.

As shown in FIG. 1, the wiper washing device 60 includes a washing liquid supply passage 61 connected with the washing liquid cartridge attachment portion 150, and a liquid feeding pump 62 feeding the washing liquid in the washing liquid supply passage 61. The washing liquid supply passage 61 includes an inlet-side end 61*a* connected with a connection portion 152 (see also FIG. 8) of the washing liquid cartridge attachment portion 150 and an outlet-side end 61*b* opened toward the wiper 51. The connection portion 152 of the washing liquid cartridge attachment portion 150 is a mechanism connectable with the washing liquid cartridge C2. In the washing liquid supply passage 61, the washing liquid supplied from the washing liquid cartridge C2 and fed by the liquid feeding pump 62 flows. The washing liquid supply passage 61 is, for example, a tube. The washing liquid supply passage 61 is not limited to a tube. The outlet-side end 61*b* of the washing liquid supply passage 61 is secured such that the washing liquid flowing out of the outlet-side end 61*b* is dropped directly onto the wiper 51. The wiper washing device 60 may include, for example, a valve or the like in addition to the washing liquid supply passage 61 and the liquid feeding pump 62.

The wiper washing device 60 is not limited to having the above-described configuration. For example, the wiper washing device 60 may supply the washing liquid in the washing liquid cartridge C2 into a washing liquid container and immerse the wiper 51 in the washing liquid in the washing liquid container to wash the wiper 51.

Hereinafter, a configuration of an ink cartridge attachment portion 100, to which the ink cartridge C1 is attachable, and a configuration of the washing liquid cartridge attachment portion 150, to which the washing liquid cartridge C2 is attachable, will be described. First, the configuration of an ink cartridge attachment portion 100 will be described.

As shown in FIG. 1, the printer 10 according to this preferred embodiment includes a plurality of the ink cartridge attachment portions 100. One ink cartridge C1 is attachable to one ink cartridge attachment portion 100. The plurality of ink cartridge attachment portions 100 are located in a left top portion of the printer body 11. The plurality of ink cartridge attachment portions 100 are aligned in the left-right direction. Each ink cartridge C1 is inserted into the corresponding ink cartridge attachment portion 100 from the front of the ink cartridge attachment portions 100. The ink cartridge attachment portions 100 are not limited to being located at the above-described position. There is no specific limitation on the insertion direction of the ink cartridge C1.

The ink cartridges C1 each include a pouch storing the ink and a case accommodating the pouch. The ink cartridge C1 has a substantially rectangular cuboid shape. The ink refill container is not limited to such an ink cartridge C1, and may be, for example, a pouch not accommodated in a case or a bottle.

Figure 3:
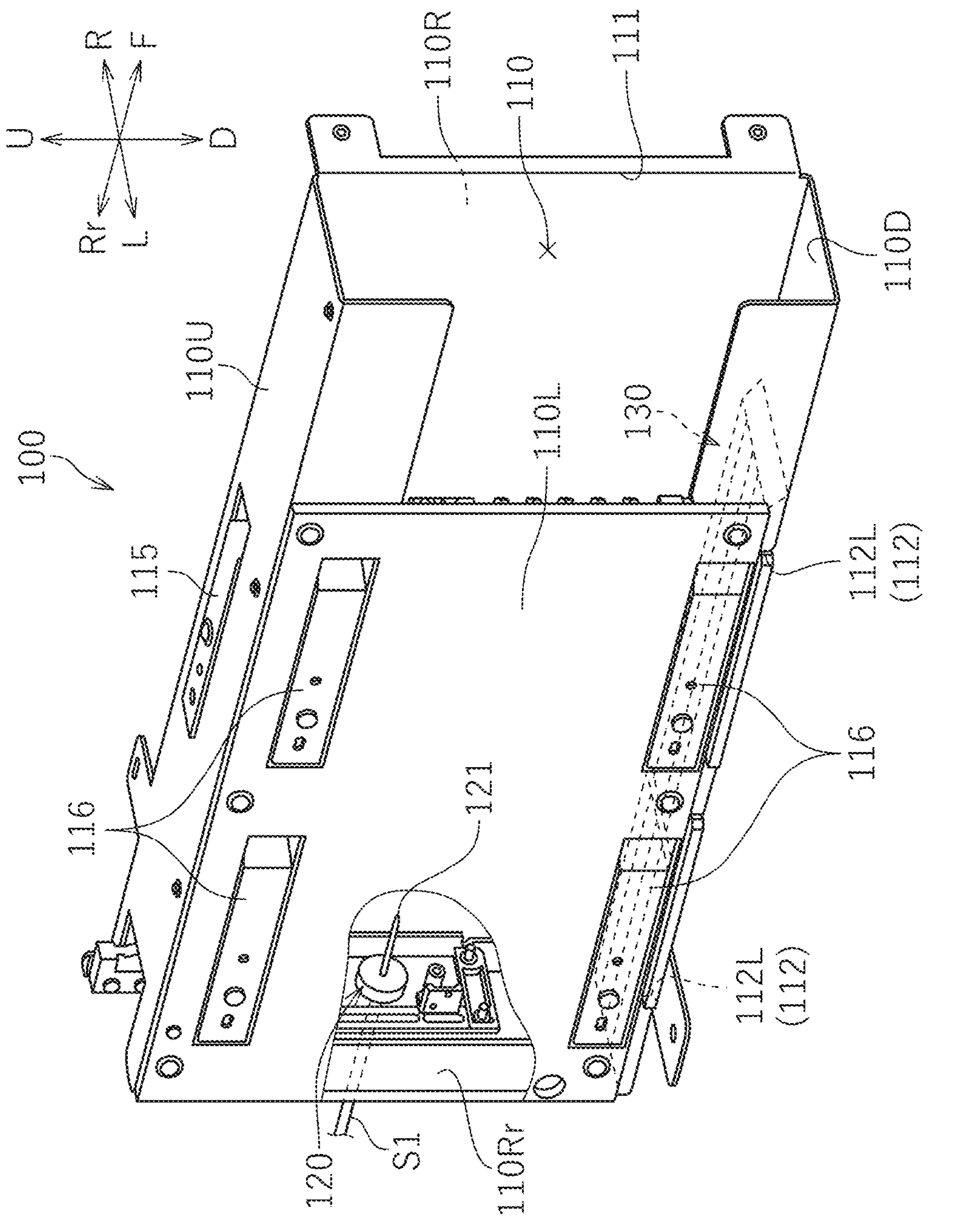
FIG. 3 is a partially cut perspective view of an ink cartridge attachment portion.
Figure 4:
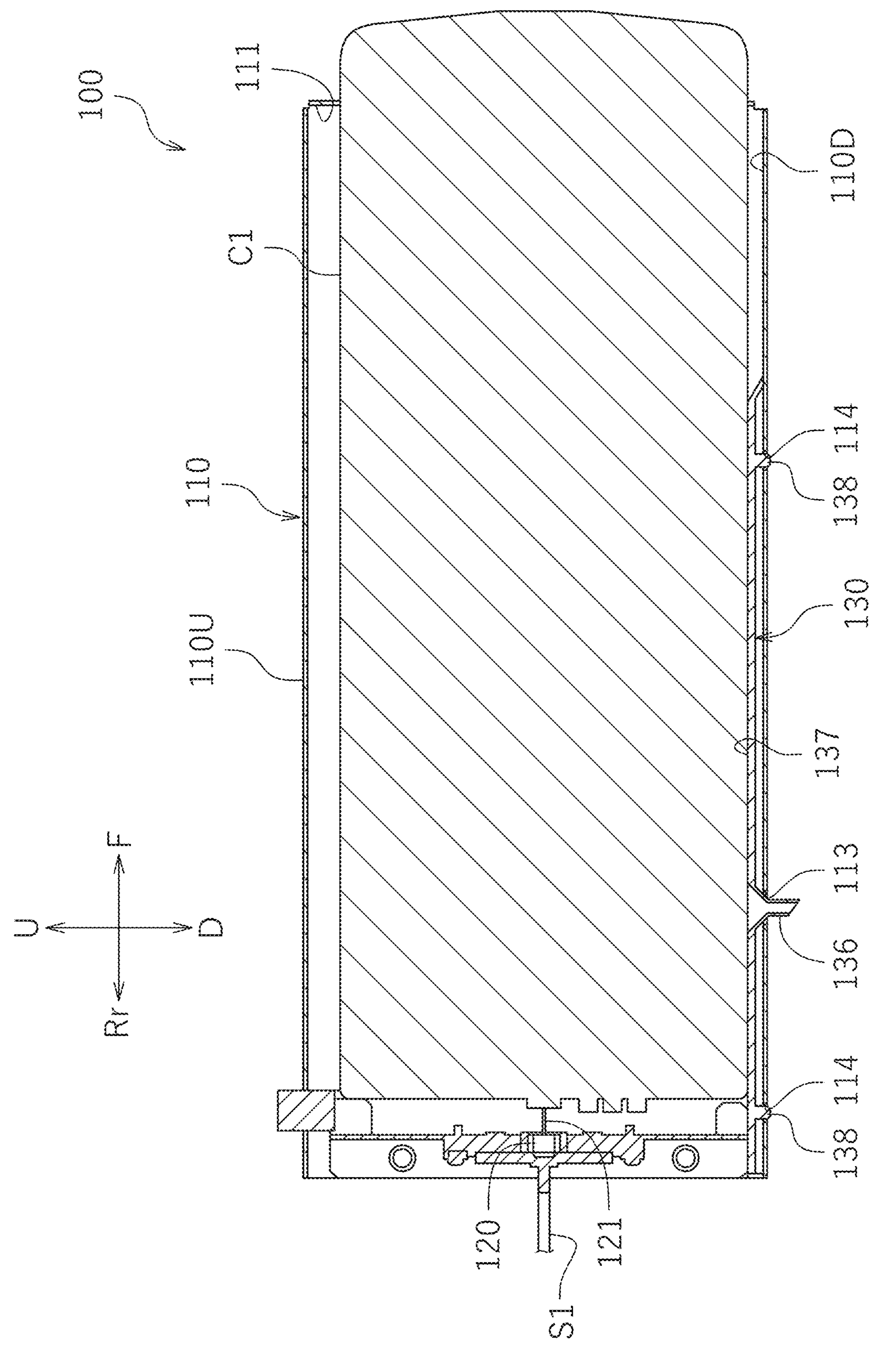
FIG. 4 is a vertical cross-sectional view of the ink cartridge attachment portion.

FIG. 3 is a partially cut perspective view of the ink cartridge attachment portion 100. FIG. 4 is a vertical cross-sectional view of the ink cartridge attachment portion 100. FIG. 3 and FIG. 4 each show only one ink cartridge attachment portion 100. FIG. 3 shows the ink cartridge attachment portion 100 in a state where the ink cartridge C1 is not attached thereto, and FIG. 4 shows the ink cartridge attachment portion 100 in a state where the ink cartridge C1 is attached thereto. As shown in FIG. 3 and FIG. 4, the ink cartridge attachment portion 100 allows the ink cartridge C1 to be attached thereto or to be detached therefrom. The ink cartridge attachment portion 100 includes a box-shaped housing 110, in which the ink cartridge C1 is allowed to be accommodated, and a connection portion 120, which is provided inside the housing 110 and with which the ink cartridge C1 accommodated in the housing 110 is connectable. The housing 110 has a shape corresponding to that of the ink cartridge C1. The connection portion 120 is in communication with the corresponding ink head 25 via an ink supply passage S1 (see also FIG. 1). The ink supply passage S1 includes, for example, a flexible tube. In this preferred embodiment, the connection portion 120 includes a hollow needle 121 extending through the pouch of the ink cartridge C1. The ink in the pouch flows through the hollow needle 121.

As shown in FIG. 3, the housing 110 includes a bottom wall 110D, a left side wall 110L, a right side wall 110R, a top wall 1100, and a rear wall 110Rr. The left side wall 110L and the right side wall 110R are respectively connected with a left end and a right end of the bottom wall 110D, and extend upward. The rear wall 110Rr is connected with a rear end of the bottom wall 110D, and extends upward. The top wall 110U is connected with top ends of the left side wall 110L, the right side wall 110R and the rear wall 110Rr. The top wall 110U faces the bottom wall 110D. One surface of the housing 110, in this preferred embodiment, a front surface defines an insertion opening 111, into which the ink cartridge C1 is insertable. The walls of the housing 110 are not limited to having the above-described configuration. For example, the housing 110 may have an incomplete box shape with no top surface. There is no specific limitation on the shape of the housing 110 as long as the housing 110 includes the bottom wall 110D, at least a portion of the ink cartridge C1 is insertable into the housing 110, and the connection portion 120 is provided inside the housing 110. The bottom wall 110D does not need to extend in the entirety of the bottom of the housing 110 and may be provided only in a portion thereof.

As shown in FIG. 3, the housing 110 includes a first leaf spring 115 preventing the ink cartridge C1 accommodated therein from coming off, and second leaf springs 116 pressing the ink cartridge C1. The first leaf spring 115 is provided in the top wall 110U. The first leaf spring 115 partially extends through the top wall 110U. The first leaf spring 115 projects into an inner space of the housing 110. When the ink cartridge C1 is moved in such a direction as to be detached from the housing 110 (in this preferred embodiment, moved forward), the first leaf spring 115 contacts a portion of the ink cartridge C1 and thus reduces or prevents a situation where the ink cartridge C1 inadvertently comes off. The second leaf springs 116 are provided in the left side wall 110L of the housing 110. Two second leaf springs 116 are provided in a top area of the left side wall 110L, and two second leaf springs 116 are provided in a bottom area of the left side wall 110L. Each of the second leaf springs 116 partially extend through the left side wall 110L. The second leaf springs 116 project into the inner space of the housing 110. The second leaf springs 116 press the ink cartridge C1 rightward. With such a configuration, the ink cartridge C1 is located at a predetermined position in the left-right direction in the housing 110.

As shown in FIG. 3, the needle 121 is provided on the rear wall 110Rr of the housing 110. The ink cartridge C1 is inserted into the housing 110 of the ink cartridge attachment portion 100 through the insertion opening 111 and pushed rearward until the needle 121 pierces into the pouch, so that the ink cartridge C1 and the connection portion 120 are connected with each other. The ink cartridge C1 and the connection portion 120 are connected with each other inside the housing 110.

Figure 5:
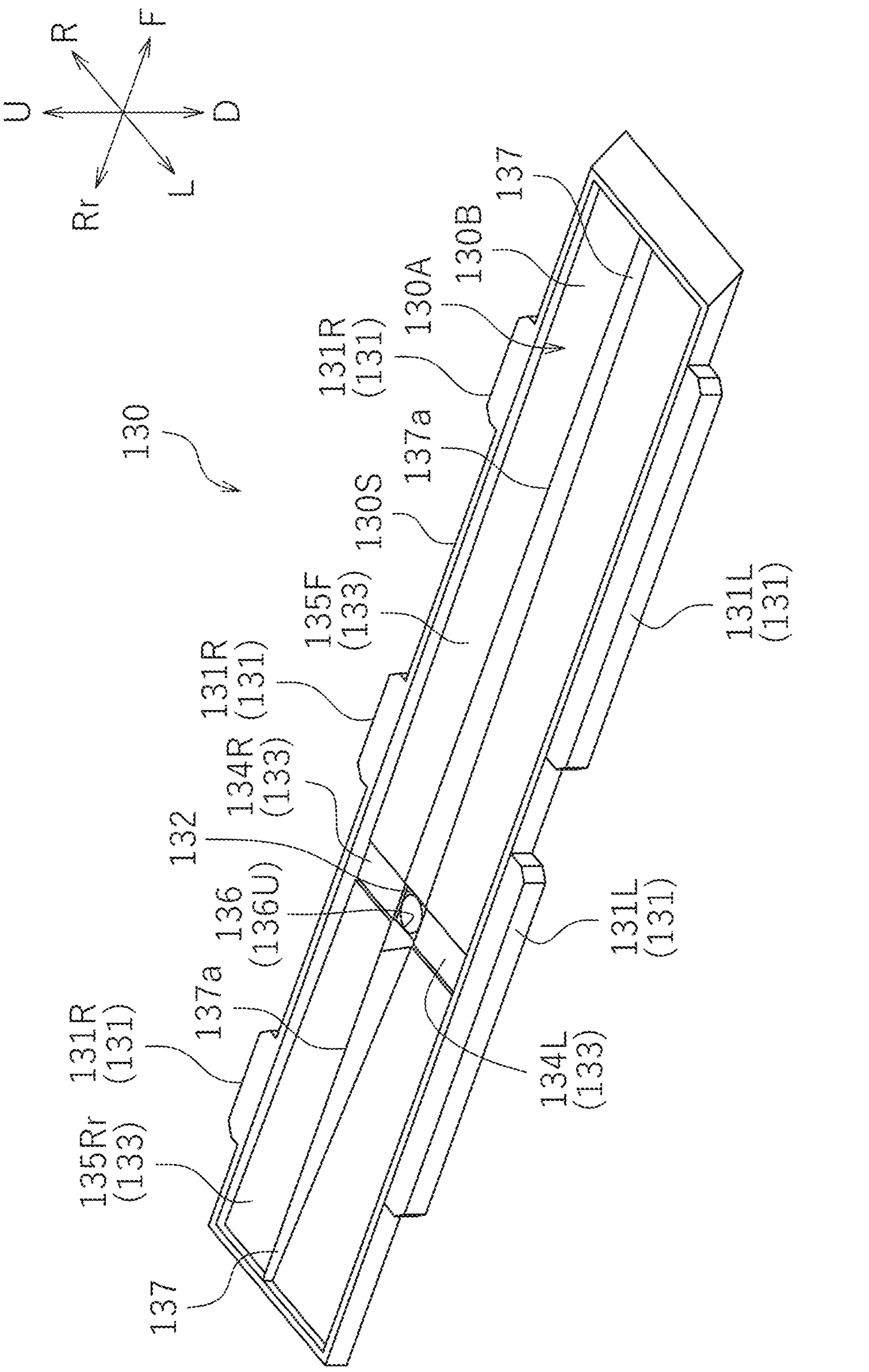
FIG. 5 is a top perspective view of an ink tray.
Figure 6:
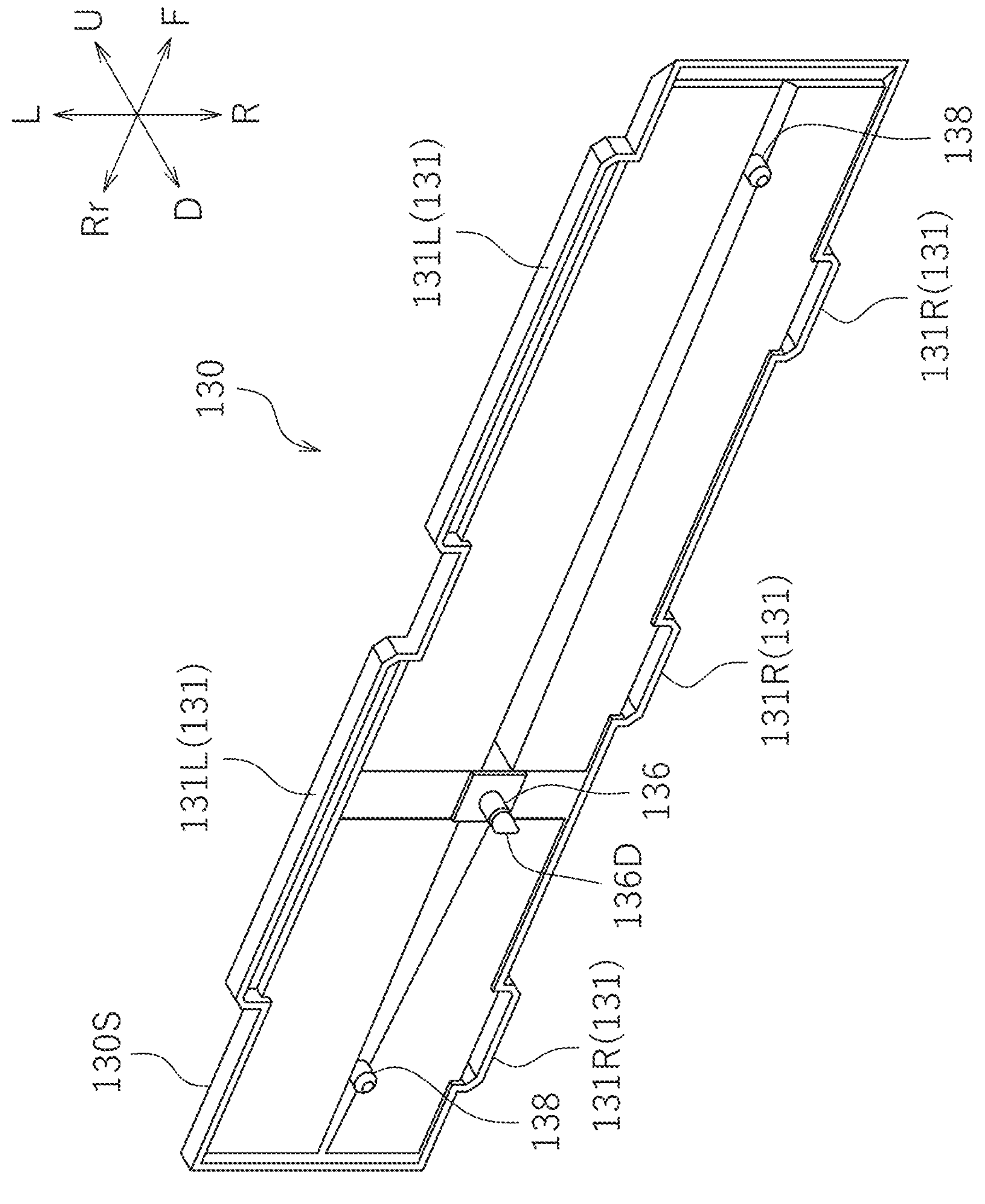
FIG. 6 is a bottom perspective view of the ink tray.

As shown in FIG. 3, the ink cartridge attachment portion 100 according to this preferred embodiment includes an ink tray 130 capable of accommodating the ink. The ink tray 130 is located in an area, in the housing 110, that is below the connection portion 120. In this preferred embodiment, the ink tray 130 is located on the bottom wall 110D of the housing 110. The bottom wall 110D of the housing 110 is an example of placement surface on which the ink tray 130 is placed. In the case where the ink leaks while or after the ink cartridge C1 and the connection portion 120 are connected with each other, the ink tray 130 receives the leaking ink. FIG. 5 is a top perspective view of the ink tray 130. FIG. 6 is a bottom perspective view of the ink tray 130. As shown in FIG. 5, the ink tray 130 includes an accommodation portion 130A recessed downward and capable of accommodating the ink. The accommodation portion 130A is defined by a bottom surface 130B provided below the connection portion 120 and receiving the ink and side walls 130S extending upward from a peripheral edge of the bottom surface 130B. In this preferred embodiment, the ink tray 130 is preferably made of a resin resistant to ink, for example, POM.

As shown in FIG. 5, the ink tray 130 includes a plurality of engagement projections 131 provided on left and right side surfaces thereof. As shown in FIG. 3, the left side wall 110L and the right side wall 110R each include engagement holes 112 (only two engagement holes 112L in the left side wall 110L are shown), into which the engagement projections 131 may be fitted. Two left engagement projections 131L are fitted into the two left engagement holes 112L in the left side wall 110L of the housing 110. Three right engagement projections 131R are fitted into three right engagement holes (not shown) in the right side wall 110R of the housing 110. The ink tray 130 is secured to the housing 110 by a snap-fit method utilizing the elasticity of the resin used to form the ink tray 130. The engagement projections 131 are portions of the ink tray 130, and are also made of a resin, for example. The engagement holes 112 are each an example of engagement portion provided in an inner side surface of the housing 110 and engageable with the engagement projection 131. In this preferred embodiment, the engagement portions are the engagement holes 112 extending through the left side wall 110L and the right side wall 110R in the left-right direction. The engagement portions are not limited to the through-holes, and may be, for example, recessed portions that do not extend through the side walls.

As shown in FIG. 5, the bottom surface 130B of the accommodation portion 130A includes a lowest bottom portion 132 located at the lowest level in the accommodation portion 130A and an inclining surface 133 inclining downward toward the lowest bottom portion 132. The inclining surface 133 is connected with the lowest bottom portion 132. With such a configuration, the ink leaking from the connection portion 120 and dropped down onto the bottom surface 130B gathers in the lowest bottom portion 132. In this preferred embodiment, the lowest bottom portion 132 is located at a position that is a center in the left-right direction of the ink tray 130 and is slightly to the rear of a center in the front-rear direction. The lowest bottom portion 132 includes a discharge outlet 136, through which the ink is discharged. The lowest bottom portion 132 is flat such that the discharge outlet 136 is easily formed.

As shown in FIG. 5, the inclining surface 133 includes a first left inclining surface 134L, which is connected with a left end of the lowest bottom portion 132 and extends leftward from the lowest bottom portion 132, and a first right inclining surface 134R connected with a right end of the lowest bottom portion 132 and extends rightward from the lowest bottom portion 132. The first left inclining surface 134L and the first right inclining surface 134R both extend to define a band shape. The first left inclining surface 134L inclines downward and rightward, and has a right end thereof connected with the left end of the lowest bottom portion 132. The first right inclining surface 134R inclines downward and leftward, and has a left end thereof connected with the right end of the lowest bottom portion 132.

The inclining surface 133 further includes a second front inclining surface 135F provided to the front of the first inclining surfaces 134L and 134R and connected with the first inclining surfaces 134L and 134R, and a second rear inclining surface 135Rr provided to the rear of the first inclining surfaces 134L and 134R and connected with the first inclining surfaces 134L and 134R. The second front inclining surface 135F inclines downward and rearward and has a rear end thereof connected to front ends of the first inclining surfaces 134L and 134R. The second rear inclining surface 135Rr inclines downward and forward and has a front end thereof connected to rear ends of the first inclining surfaces 134L and 134R.

As shown in FIG. 5, the ink tray 130 includes a support portion 137 supporting a bottom surface of the ink cartridge C1 accommodated in the housing 110. The support portion 137 projects upward with respect to the second inclining surfaces 135F and 135Rr. The support portion 137 is located at a center in the left-right direction of the ink tray 130, and extends in the front-rear direction. The support portion 137 divides each of the second front inclining surface 135F and the second rear inclining surface 135Rr into a left portion and a right portion. The support portion 137 is disconnected at a position above the lowest bottom portion 132 and divided into a front portion and a rear portion.

In this preferred embodiment, the support portion 137 also defines and functions as a guide that supports the bottom surface of the ink cartridge C1 while the ink cartridge C1 is inserted into the housing 110 through the insertion opening 111. The support portion 137 extends in the front-rear direction, which is an insertion direction in which the ink cartridge C1 is inserted into the housing 110 through the insertion opening 111. The support portion 137 contacts the bottom surface of the ink cartridge C1. Therefore, the support portion 137 is capable of supporting the bottom surface of the ink cartridge C1 in the insertion direction. The support portion 137 has a width (i.e., a length thereof in a direction perpendicular to the insertion direction of the ink cartridge C1; in this preferred embodiment, the width in the left-right direction) that is narrower than a width of the ink cartridge C1. In more detail, the support portion 137 has a cross-section of a substantial triangle having two apexes contacting the bottom surface 130B and the other apex located above the bottom surface 130B. The top apex defines a ridge-shaped support line 137*a* extending in the front-rear direction. The ink tray 130 supports the bottom surface of the ink cartridge C1 by the support line 137*a*. The support portion 137 determines the level of the ink cartridge C1 with respect to the connection portion 120, and contacts the ink cartridge C1 along a line (the support line 137*a*) to accurately determine the level of the ink cartridge C1 with respect to the connection portion 120. The ink cartridge C1 is pressed from above by the first leaf spring 115 and is also pressed from the sides by the second leaf springs 116, and thus is held in a stable state in the left-right direction and the up-down direction. In this case, if the support portion 137 has a width of a certain size or greater, the support portion 137 does not contact the ink cartridge C1 at constant positions, and the level of the positions at which the support portion 137 contacts the ink cartridge C1 is varied. In this preferred embodiment, the support portion 137 contacts the ink cartridge 137 C1 along a line (the support line 137*a*). Therefore, the level of the positions at which the support portion 137 contacts the ink cartridge C1 is not varied, and the support portion 137 positions the ink cartridge C1 accurately. In addition, as compared with the case where the support portion 137 has a width of a certain size or greater, the frictional resistance generated when the ink cartridge C1 is inserted into the housing 110 is alleviated. Therefore, the work of inserting the ink cartridge C1 is made easy. It is preferred that the support portion 137 is located at least below the connection portion 120 in order to determine the level of the ink cartridge C1 with respect to the connection portion 120.

The discharge outlet 136 is provided in the lowest bottom portion 132 of the ink tray 130. The discharge outlet 136 is an outlet into which the ink is dropped. The discharge outlet 136 extends through the ink tray 130 in the up-down direction. As shown in FIG. 6, in this preferred embodiment, the discharge outlet 136 has a cylindrical shape extending in the up-down direction. Alternatively, the discharge outlet 136 may be a simple through-hole extending through the ink tray 130 in the up-down direction. As shown in FIG. 5, a top end 136U of the discharge outlet 136 is opened at the lowest bottom portion 132. As shown in FIG. 6, a bottom end 136D of the discharge outlet 136 is located below the bottom surface 130B. The bottom end 136D of the discharge outlet 136 is obliquely cut such that the ink is drained therefrom quickly.

As shown in FIG. 4, a through-hole 113, in which the discharge outlet 136 passes, is provided in the bottom wall 110D of the housing 110. The through-hole 113 is located to overlap the discharge outlet 136 as seen in a plan view, and extends through the bottom wall 110D in the up-down direction. In this preferred embodiment, the through-hole 113 is located at such a position in the up-down direction as to overlap the discharge outlet 136 as seen in a side view. The discharge outlet 136 is inserted into the through-hole 113. As shown in FIG. 4, the discharge outlet 136 passes through the through-hole 113 and extends to a position below the housing 110. Alternatively, the discharge outlet 136 may be located at a position above the through-hole 113.

A plurality of positioning projections 138 positioning the ink tray 130 with respect to the housing 110 are provided on a bottom surface of the ink tray 130. The positioning projections 138 extend downward from the bottom surface of the ink tray 130. As shown in FIG. 4, a plurality of positioning holes 114, into which the plurality of positioning projections 138 are respectively insertable, are provided in the bottom wall 110D of the housing 110. In this preferred embodiment, the plurality of positioning holes 114 extend through the bottom wall 110D of the housing 110 in the up-down direction. Alternatively, the positioning projections 138 may be inserted into recessed portions that do not extend through the bottom wall 110D.

Figure 7:
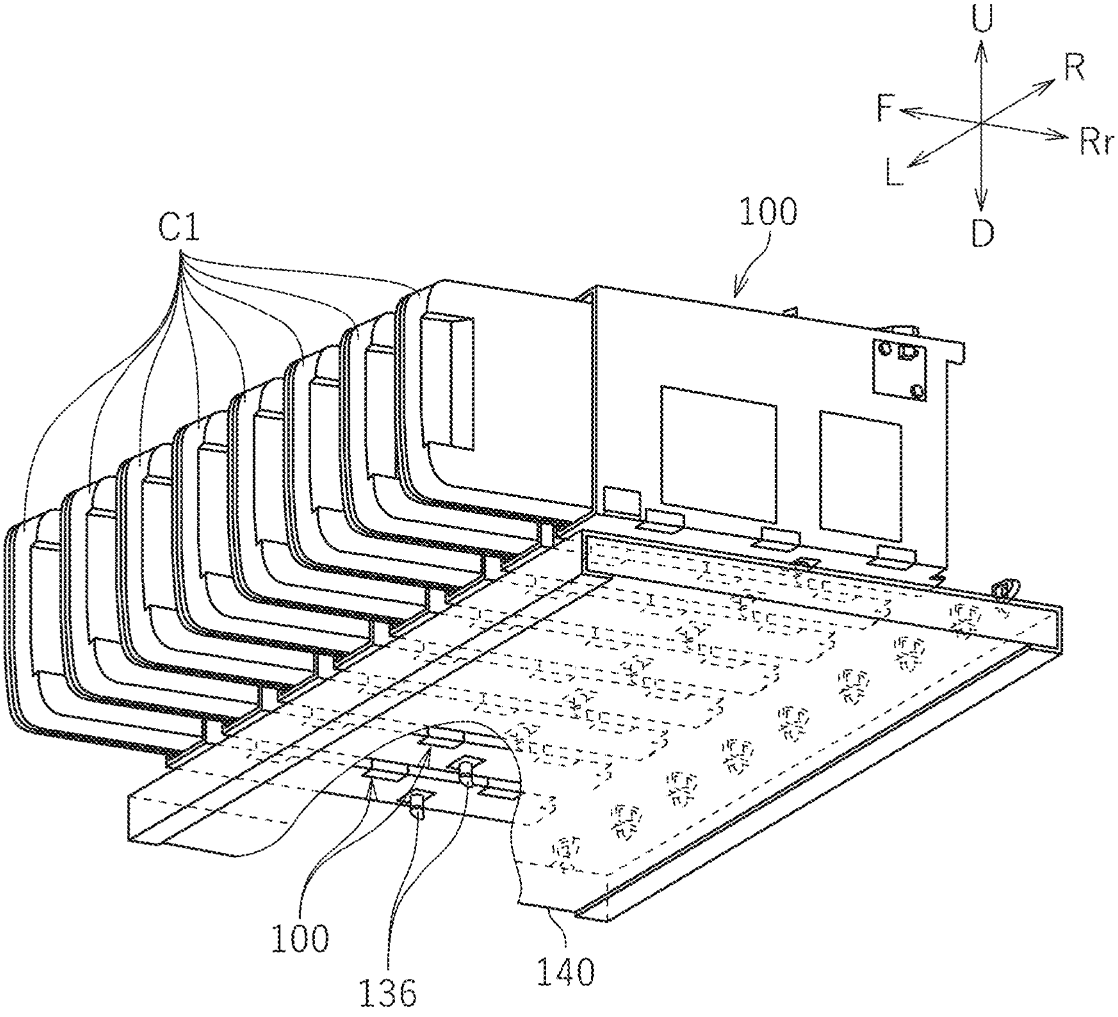
FIG. 7 is a partially cut bottom perspective view of a plurality of ink cartridge attachment portions and a drain container.

FIG. 7 is a partially cut bottom perspective view of the plurality of ink cartridge attachment portions 100. As shown in FIG. 7, a drain container 140 is provided below the plurality of ink cartridge attachment portions 100 aligned in the left-right direction. The drain container 140 receives the ink dropped from the discharge outlet 136 of each of the ink cartridge attachment portions 100. The drain container 140 is provided below the discharge outlets 136 of the ink trays 130 and the through-holes 113 of the housings 110, and is capable of storing the ink dropped from the discharge outlets 136. The drain container 140 is provided such that all the discharge outlets 136 are located inside the drain container 140 as seen in a plan view. The drain container 140 is capable of accommodating the entire amount of the ink stored in one ink cartridge C1. With such a configuration, even if a majority of the ink stored in one ink cartridge C1 spills for some reason, all the spilt ink is accommodated in the drain container 140.

Now, a configuration of the washing liquid cartridge attachment portion 150 will be described. As shown in FIG. 1, in this preferred embodiment, the washing liquid cartridge attachment portion 150 is located in a right portion of the printer body 11. The washing liquid cartridge C2 is inserted into the washing liquid cartridge attachment portion 150 from the right of the washing liquid cartridge attachment portion 150. The washing liquid cartridge attachment portion 150 is not limited to being located at the above-described position. There is no specific limitation on the insertion direction of the washing liquid cartridge C2.

Figure 8:
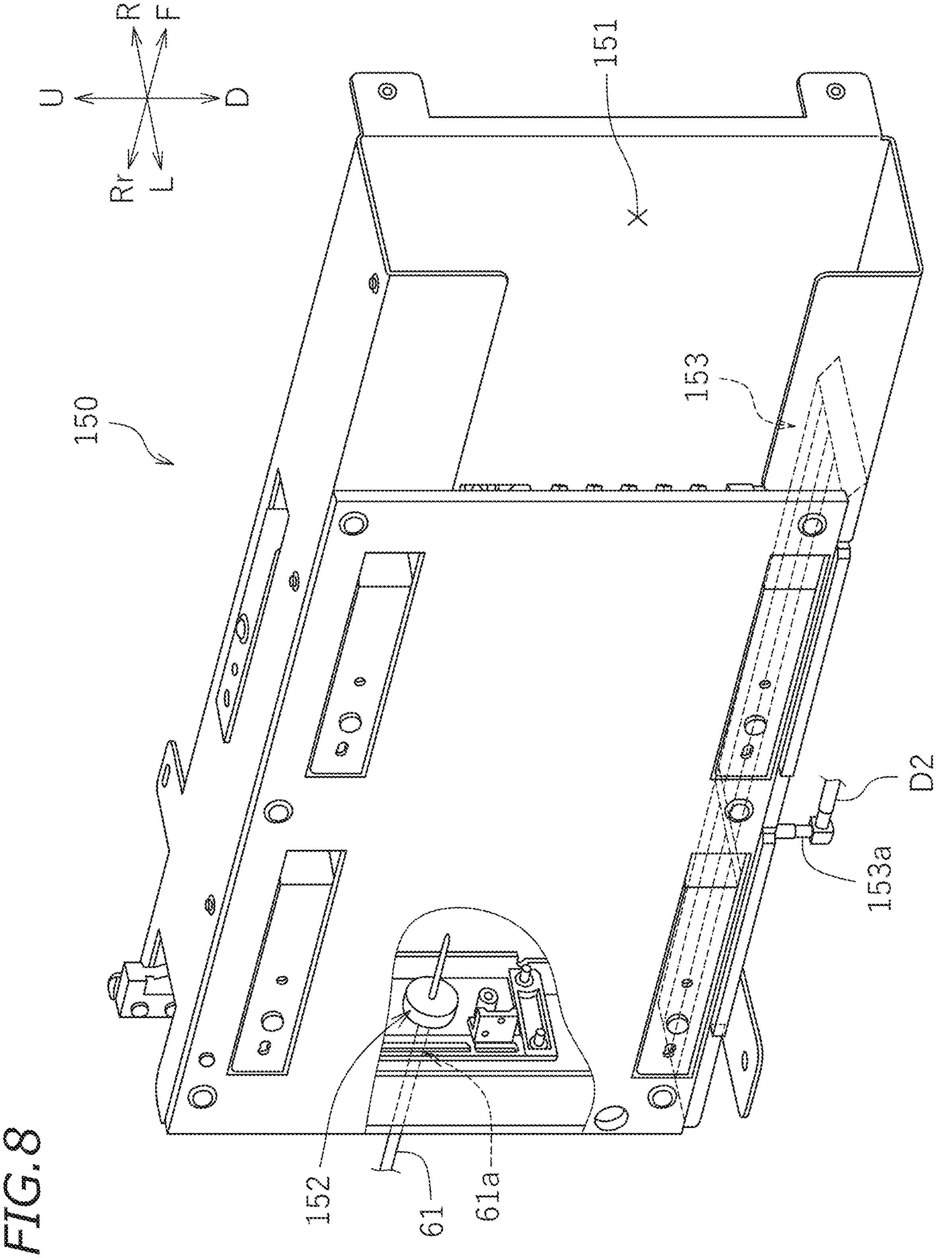
FIG. 8 is a partially cut perspective view of a washing liquid cartridge attachment portion.

FIG. 8 is a partially cut perspective view of the washing liquid cartridge attachment portion 150. As shown in FIG. 8, the washing liquid cartridge attachment portion 150 includes a housing 151, in which the washing liquid cartridge C2 is allowed to be accommodated (see FIG. 1), a connection portion 152 provided inside the housing 151 and connectable with the washing liquid cartridge C2, and a washing liquid tray 153 located in an area, in the housing 151, that is below the connection portion 152. The washing liquid tray 153 is capable of accommodating the washing liquid. The washing liquid tray 153 is located below the connection portion 152 so as to receive the washing liquid leaking from the connection portion 152. The connection portion 152 is connected with the washing liquid supply passage 61 of the wiper washing device 60, in more detail, the inlet-side end 61*a* of the washing liquid supply passage 61. In this preferred embodiment, the configuration of the washing liquid cartridge attachment portion 150 is the same as the configuration of the ink cartridge attachment portion 100. Alternatively, the configuration of the washing liquid cartridge attachment portion 150 may be different from the configuration of the ink cartridge attachment portion 100. As shown in FIG. 8, a discharge outlet 153*a* of the washing liquid cartridge attachment portion 150 is connected with one end of a washing liquid discharge passage D2. The other end of the washing liquid discharge passage D2 is connected with a waste liquid container 160 (see FIG. 1) capable of storing a waste liquid. The washing liquid discharge passage D2 includes, for example, a flexible tube. In the case where the washing liquid leaks inside the housing 151 of the washing liquid cartridge attachment portion 150, the leaking washing liquid is moved to the waste liquid container 160 without being once received by a drain container. Alternatively, the discharge outlet 153*a* of the washing liquid cartridge attachment portion 150 may allow the washing liquid to be dropped into the drain container below the discharge outlet 153*a*, like the discharge outlet 136 of the ink cartridge attachment portion 100. In this case, the discharge outlet 153*a* of the washing liquid cartridge attachment portion 150 may have the same configuration as that of the discharge outlet 136 of the ink cartridge attachment portion 100.

Hereinafter, the functions and effects provided by the printer 10 according to this preferred embodiment will be described. The printer 10 according to this preferred embodiment includes the ink heads 25 and the ink cartridge attachment portions 100 each allowing the ink cartridge C1, storing the ink, to be attached thereto or to be detached therefrom. The ink cartridge attachment portions 100 each include the housing 110, in which the ink cartridge C1 is allowed to be accommodated, the connection portion 120 provided inside the housing 110 and connectable with the ink cartridge C1, and the ink tray 130 capable of accommodating the ink and located in an area, in the housing 110, that is below the connection portion 120.

With the printer 10 having such a configuration, even if the ink leaks inside the housing 110 from the connection portion 120 while or after the ink cartridge C1 is connected with the connection portion 120, the leaking ink is accommodated in the ink tray 130 provided in an area, in the housing 110, that is below the connection portion 120. This reduces or prevents spreading of the leaking ink to the outside of the housing 110.

With the printer 10 having such a configuration, the cost of the ink cartridge is lower than in the inkjet printer described in, for example, Japanese Laid-Open Patent Publication No. Hei 4-19150. It is rare that ink leaks from the position at which the ink cartridge and the connection portion are connected with each other although it is possible. Therefore, it is not efficient to provide an ink absorber for each of all the ink cartridges, which are consumables. In the printer 10 according to this preferred embodiment, the ink tray 130 accommodating the ink is provided in the ink cartridge attachment portion 100. Therefore, it is not necessary to provide an ink absorber for the ink cartridge C1, and thus the extending cost regarding the ink is decreased.

In this preferred embodiment, the ink tray 130 includes the support portion 137 projecting upward and supporting the bottom surface of the ink cartridge C1 accommodated in the housing 110. With such a configuration, the ink tray 130 capable of accommodating the leaking ink also has a role of supporting the ink cartridge C1 in the housing 110. The ink tray 130 allows the ink cartridge C1 to be held in the housing 110 with certainty with no need to provide any additional member or structure to support the ink cartridge C1.

In this preferred embodiment, the housing 110 includes the insertion opening 11, through which the ink cartridge C1 is insertable, provided at a side surface thereof. The support portion 137 extends in the insertion direction of the ink cartridge C1, and has a length, in the width direction perpendicular to the insertion direction, shorter than that of the ink cartridge C1. With such a configuration, because the support portion 137 extends in the insertion direction of the ink cartridge C1, the bottom surface of the ink cartridge C1 is supported by the support portion 137 in the insertion direction while the ink cartridge C1 is inserted into the housing 110 through the insertion opening 111. Therefore, the support portion 137 is capable of guiding the insertion of the ink cartridge C1 into the housing 110. In addition, with the above-described configuration, because the width of the support portion 137 is narrower than the width of the ink cartridge C1, the frictional resistance generated when the ink cartridge C1 is inserted into the housing 110 is alleviated.

In this preferred embodiment, the ink tray 130 includes the discharge outlet 136, which extends through the ink tray 130 in the up-down direction and into which the ink may be dropped. The housing 110 includes the bottom wall 110D as a placement surface on which the ink tray 130 is placed. The bottom wall 110D includes the through-hole 113 overlapping the discharge outlet 136 as seen in a plan view and extends through the bottom wall 110D in the up-down direction. The printer 10 further includes the drain container 140, which is provided below the discharge outlet 130 and the through-hole 113 and is capable of recovering the ink dropped through the discharge outlet 136. With such a configuration, the ink dropped onto the ink tray 130 passes the discharge outlet 136 extending through the through-hole 113, and moves to the drain container 140. Therefore, the ink tray 130 stores the ink merely temporarily. Thus, the ink does not spill much from the ink tray 130.

In this preferred embodiment, the discharge outlet 136 has a cylindrical shape extending in the up-down direction, and extends through the ink tray 130 to a position below the housing 110. With such a configuration, the ink discharged from the ink tray 130 is not spattered around the through-hole 113, and thus the bottom surface of the ink tray 130 is prevented from being stained with the spattering ink.

In this preferred embodiment, the ink tray 130 includes the accommodation portion 130A recessed downward and capable of accommodating the ink. The accommodation portion 130A includes the lowest bottom portion 132 located at the lowest position and including the discharge outlet 136, and the inclining surface 133 connected with the lowest bottom portion 132 and inclining downward toward the lowest bottom portion 132. With such a configuration, the ink dropped onto the accommodation portion 130A of the ink tray 130 flows down along the inclining surface 133 to gather in the lowest bottom portion 132, and is discharged into the drain container 140 through the discharge outlet 136 provided in the lowest bottom portion 132. Therefore, the ink is discharged quickly, and there is very little ink that remains in the ink tray 130 without being discharged.

In this preferred embodiment, the ink dropped onto the left half of the second rear inclining surface 135Rr and the left half of the second front inclining surface 135F flows into the lowest bottom portion 132 along the first left inclining surface 134L. The ink dropped onto the right half of the second rear inclining surface 135Rr and the right half of the second front inclining surface 135F flows into the lowest bottom portion 132 along the first right inclining surface 134R.

In this preferred embodiment, the ink tray 130 includes the engagement projections 131 provided on the side surfaces thereof and made of a resin. The engagement holes 112 as the engagement portions engageable with the engagement projections 131 are provided in the inner side surfaces of the housing 110. With such a configuration, the engagement projections 131 are put into engagement with the engagement holes 112 to secure the ink tray 130 to the housing 110. The engagement projections 131 are made of a resin, and therefore, are firmly secured to the engagement holes 121 because of the elasticity of the resin. A member made of a resin, if, for example, secured with screwing, is easily crushed and may occasionally not be secured for a second time. A securing method realized by a combination of the engagement projections 131 and the engagement holes 112 fitted to each other reduces or prevents such breakage of the ink tray 130. The ink tray 130 is made of a resin, and therefore, is often warped because of an inner stress generated at the time of molding. Such a warp may be corrected when the ink tray 130 is secured by the engagement projections 131 and the engagement holes 112 fitted to each other.

The printer 10 according to this preferred embodiment includes the washing liquid cartridge attachment portion 150 allowing the washing liquid cartridge C2 to be attached thereto or to be detached therefrom, the wiper 51 to wipe the ink heads 25, and the washing liquid supply passage 61 connected with the connection portion 152 of the washing liquid cartridge attachment portion 150. The washing liquid supply passage 61 includes the inlet-side end 61*a* connected with the connection portion 152 and the outlet-side end 61*b* opened toward the wiper 51. The washing liquid cartridge attachment portion 150 includes the housing 151, in which the washing liquid cartridge C2 is allowed to be accommodated, the connection portion 152 provided inside the housing 151 and connectable with the washing liquid cartridge C2, and the washing liquid tray 153 located in an area, in the housing 151, that is below the connection portion 152. With the printer 10 having such a configuration, spreading of the leaking washing liquid to the outside of the housing 151 is reduced or prevented, like in the case of the ink in the ink cartridge attachment portion 100.

The washing liquid cartridge attachment portion 150 according to this preferred embodiment has a configuration substantially common to that of the ink cartridge attachment portion 100. Therefore, the washing liquid cartridge attachment portion 150 provides functions and effects for the washing liquid that are common to the functions and effects provided by the ink cartridge attachment portion 100 for the ink. The washing liquid cartridge attachment portion 150 may have the same configuration as that of the ink cartridge attachment portion 100 except for the liquid as the target (ink or washing liquid). In this case, the washing liquid cartridge attachment portion 150 provides functions and effects for the washing liquid that are common to the functions and effects provided by the ink cartridge attachment portion 100 for the ink.

Other Preferred Embodiments

Some preferred embodiments of the present invention are described above. The above-described preferred embodiments are merely examples, and the present invention may be carried out in any of various other preferred embodiments.

For example, in the above-described preferred embodiments, the printer 10 is of a type in which the recording medium 5 is transported on the platen 15. There is no specific limitation on the type of the printer. The printer may be a so-called flat-bed type printer including a flat bed that moves while having the recording medium 5 placed thereon.

In the above-described preferred embodiments, the ink cartridge C1 and the washing liquid cartridge C2 each have a substantially rectangular cuboid shape. The ink cartridge C1 and the washing liquid cartridge C2 may each have another shape. For example, the ink cartridge C1 and the washing liquid cartridge C2 may be cylindrical.

The preferred embodiments do not limit the present invention unless otherwise specified. For example, the liquid tray described herein may be applicable to only the ink cartridge attachment portion or only to the washing liquid cartridge attachment portion.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described specification or referred to during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inkjet printer, comprising:

an ink head including a nozzle surface with nozzles; and an attachment portion to enable attachment or detachment of an ink refill container storing ink to be ejected from the nozzles or a washing liquid refill container storing a washing liquid usable to wash the nozzle surface; wherein the attachment portion includes:

a housing to accommodate the ink refill container or the washing liquid refill container;

a connection portion provided inside the housing and connectable with the ink refill container or the washing liquid refill container; and a tray provided in the housing and below the connection portion, the housing includes:

an insertion opening through which the ink refill container or the washing liquid refill container are insertable;

a bottom wall; and a rear wall connected with a rear end of the bottom wall and facing the insertion opening, the connection portion is provided with the rear wall of the housing, and the tray is located on the bottom wall of the housing.

2. The inkjet printer according to claim 1, wherein the tray includes a support portion projecting upward and supporting a bottom surface of the ink refill container or the washing liquid refill container.

3. The inkjet printer according to claim 2, wherein the insertion opening is located at a side surface of the housing; and the support portion extends in an insertion direction of the ink refill container or the washing liquid refill container, and has a length, in a width direction perpendicular to the insertion direction, that is shorter than a length of the ink refill container or the washing liquid refill container.

4. The inkjet printer according to claim 1, wherein the tray includes a discharge outlet extending through the tray in an up-down direction, the ink or the washing liquid being dropped into the discharge outlet;

the bottom wall includes a through-hole overlapping the discharge outlet as seen in a plan view and extending through the placement surface in an up-down direction; and the inkjet printer further includes a recovery portion provided below the discharge outlet and the through-hole and capable of recovering the ink or the washing liquid dropped through the discharge outlet.

5. The inkjet printer according to claim 4, wherein the discharge outlet has a cylindrical shape extending in the up-down direction, and extends through the through-hole to a position below the housing.

6. The inkjet printer according to claim 4, wherein the tray includes an accommodation portion recessed downward and capable of accommodating the ink or the washing liquid; and the accommodation portion includes:

a bottom portion located at a lowest position and including the discharge outlet; and an inclining surface connected with the bottom portion and inclining downward toward the bottom portion.

7. The inkjet printer according to claim 1, wherein the tray includes a projection provided on a side surface thereof and made of a resin; and the housing includes an engagement portion, engageable with the projection, in an inner side surface thereof.

8. The inkjet printer according to claim 1, further comprising:

a wiper to wipe the ink head; and a washing liquid supply passage including a first end connected with the connection portion and a second end opened toward the wiper; wherein the attachment portion has the washing liquid refill container attached thereto.

* * * * *